United States Patent
Schlegel

(10) Patent No.: US 11,493,073 B2
(45) Date of Patent: Nov. 8, 2022

(54) LOCKING MECHANISM FOR A PLUG CONNECTOR HOUSING

(71) Applicant: HARTING ELECTRIC GMBH & CO. KG, Espelkamp (DE)

(72) Inventor: Bernard Schlegel, Rahden (DE)

(73) Assignee: HARTING ELECTRIC GMBH & CO. KG

( * ) Notice: Subject to any disclaimer, the term of this patent is extended or adjusted under 35 U.S.C. 154(b) by 432 days.

(21) Appl. No.: 16/639,034

(22) PCT Filed: Aug. 7, 2018

(86) PCT No.: PCT/DE2018/100694
§ 371 (c)(1),
(2) Date: Feb. 13, 2020

(87) PCT Pub. No.: WO2019/034203
PCT Pub. Date: Feb. 21, 2019

(65) Prior Publication Data
US 2020/0224701 A1 Jul. 16, 2020

(30) Foreign Application Priority Data

Aug. 18, 2017 (DE) ...................... 10 2017 118 918.1
Dec. 14, 2017 (DE) ...................... 10 2017 130 005.8
Jan. 26, 2018 (DE) ...................... 10 2018 101 789.8

(51) Int. Cl.
*F16B 21/18* (2006.01)
*F16B 5/07* (2006.01)
(Continued)

(52) U.S. Cl.
CPC .............. *F16B 21/186* (2013.01); *F16B 5/07* (2013.01); *F16B 21/165* (2013.01);
(Continued)

(58) Field of Classification Search
CPC ................ H01R 13/508; H01R 13/187; H01R 13/62927; H01R 13/639; F16B 21/186; F16B 21/165; F16B 5/07
See application file for complete search history.

(56) References Cited

U.S. PATENT DOCUMENTS

| 1,965,939 A | 7/1934 | Jacobii | 70/29 |
| 3,046,513 A | 7/1962 | Crowley | 339/91 |

(Continued)

FOREIGN PATENT DOCUMENTS

| CA | 2 686 893 | 6/2010 | E05B 57/00 |
| CN | 101748941 | 6/2010 | E05B 65/00 |

(Continued)

OTHER PUBLICATIONS

International Search Report and Written Opinion (w/translation) issued in application No. PCT/DE2018/100978, dated Mar. 22, 2019 (16 pgs).

(Continued)

*Primary Examiner* — Marcus E Harcum
(74) *Attorney, Agent, or Firm* — Hayes Soloway P.C.

(57) ABSTRACT

A locking mechanism for first and second housing parts of a housing of a plug connector, includes a push button, which extends in the axial longitudinal direction through an opening of the first housing part into the interior of the housing. The push button is movably arranged, relative to the housing, between predetermined first and second axial positions, which correspond with the first and second positions of the housing parts. The push button and an interior locking element are configured such that the push button is in pressure contact to the locking element and interacts with the locking element such that, in the case of movement of the push button from the first to the second positions a radial pressure contact between the two housing parts is provided (Continued)

such that a gap between the first and second housing parts is minimized.

19 Claims, 10 Drawing Sheets

(51) Int. Cl.
| | |
|---|---|
| *F16B 21/16* | (2006.01) |
| *H01R 13/187* | (2006.01) |
| *H01R 13/508* | (2006.01) |
| *H01R 13/629* | (2006.01) |
| *H01R 13/639* | (2006.01) |

(52) U.S. Cl.
CPC ......... *H01R 13/187* (2013.01); *H01R 13/508* (2013.01); *H01R 13/62927* (2013.01); *H01R 13/639* (2013.01)

(56) References Cited

U.S. PATENT DOCUMENTS

| | | | | |
|---|---|---|---|---|
| 4,120,553 | A | 10/1978 | Muz | 339/91 R |
| 4,146,682 | A | 3/1979 | Nakao | 429/97 |
| 4,179,143 | A | 12/1979 | Shy | 292/179 |
| 4,227,762 | A | 10/1980 | Scheiner | 339/91 R |
| 4,774,399 | A | 9/1988 | Fujita et al. | 235/441 |
| 4,843,477 | A | 6/1989 | Mizutani et al. | 358/248 |
| 4,941,841 | A | 7/1990 | Darden et al. | 439/377 |
| 5,061,112 | A * | 10/1991 | Monford, Jr. | F16B 21/183 |
| | | | | 403/DIG. 1 |
| 5,207,544 | A | 5/1993 | Yamamoto et al. | 411/348 |
| 5,220,520 | A | 6/1993 | Kessoku | 364/708 |
| 5,409,393 | A | 4/1995 | Perkins et al. | 439/347 |
| 5,474,309 | A | 12/1995 | Balsells | 277/163 |
| 5,588,862 | A | 12/1996 | Perkins et al. | 439/347 |
| 5,603,630 | A | 2/1997 | Villain | 439/347 |
| 5,615,250 | A | 3/1997 | Kobayashi | 379/61 |
| 5,658,162 | A | 8/1997 | Harting et al. | 439/372 |
| 5,716,730 | A | 2/1998 | Deguchi | 429/97 |
| 5,845,898 | A | 12/1998 | Halder et al. | 269/48.1 |
| 5,860,302 | A | 1/1999 | James | 70/63 |
| 5,865,640 | A | 2/1999 | Tadokoro | 439/347 |
| 5,893,772 | A * | 4/1999 | Carmo | H01R 13/639 |
| | | | | 439/348 |
| 5,903,132 | A | 5/1999 | Ohira et al. | 320/107 |
| 5,993,240 | A | 11/1999 | Schaefer | 439/359 |
| 6,168,881 | B1 | 1/2001 | Fischer et al. | 429/97 |
| 6,356,053 | B1 | 3/2002 | Sandoz et al. | 320/11.5 |
| 6,450,828 | B1 | 9/2002 | Gordon | 439/347 |
| 6,469,900 | B2 | 10/2002 | Cheng | 361/726 |
| 6,757,172 | B2 | 6/2004 | Maruyama | 361/737 |
| 6,767,230 | B2 | 7/2004 | Lai | 439/153 |
| 6,942,514 | B1 | 9/2005 | Cheng et al. | 439/328 |
| 6,943,527 | B2 | 9/2005 | Liu et al. | 320/107 |
| 7,080,889 | B2 | 7/2006 | Ling et al. | 300/334 |
| 7,364,452 | B2 | 4/2008 | Carver et al. | 439/310 |
| 7,817,414 | B2 | 10/2010 | Chou et al. | 361/679.41 |
| 8,092,241 | B2 | 1/2012 | Chang | 439/305 |
| 8,328,562 | B1 | 12/2012 | Rassoolkhani et al. | 439/34 |
| 8,444,190 | B2 | 5/2013 | Schmidt et al. | 292/202 |
| 8,498,123 | B2 | 7/2013 | Kawada et al. | 361/732 |
| 8,549,724 | B2 | 10/2013 | Davies | 29/525.01 |
| 8,591,160 | B2 | 11/2013 | Shinozaki | 411/347 |
| 8,951,060 | B2 | 2/2015 | Meyer-Ebeling | H01R 13/639 |
| 8,961,213 | B2 | 2/2015 | Retailleau et al. | H01R 13/639 |
| 9,093,789 | B2 | 7/2015 | Aoki | H01R 13/641 |
| 9,228,602 | B2 | 1/2016 | Kelly et al. | F16B 21/073 |
| 9,312,630 | B2 | 4/2016 | Huang | H01R 13/62 |
| 9,458,868 | B2 | 10/2016 | Mettern et al. | F16B 5/0621 |
| 9,482,255 | B2 | 11/2016 | Changsrivong et al. | F16B 17/00 |
| 9,685,735 | B1 * | 6/2017 | Chen | H01R 12/721 |
| 9,829,028 | B2 | 11/2017 | Changsrivong et al. | F16B 21/125 |
| 10,320,100 | B2 | 6/2019 | Phillips | H01R 12/7005 |
| 10,826,235 | B2 | 11/2020 | Shain | H01R 13/6275 |
| 10,975,982 | B2 | 4/2021 | Wilhelm | F16K 35/025 |
| 2008/0250550 | A1 | 10/2008 | Bologna et al. | 2/425 |
| 2012/0301248 | A1 | 11/2012 | Arnold et al. | 411/347 |
| 2013/0149031 | A1 | 6/2013 | Changsrivong et al. | F16B 17/00 |
| 2013/0210258 | A1 | 8/2013 | Retailleau et al. | H01R 13/639 |
| 2013/0330120 | A1 | 12/2013 | Blanchard | F16B 21/165 |
| 2014/0130329 | A1 | 5/2014 | Changsrivong et al. | F16B 17/00 |
| 2016/0032952 | A1 | 2/2016 | McBroom et al. | F16G 5/06 |
| 2020/0194923 | A1 * | 6/2020 | Münch | H01R 13/5202 |
| 2020/0224701 | A1 | 7/2020 | Schlegel | |
| 2020/0321729 | A1 | 10/2020 | Schlegel | |
| 2021/0131472 | A1 | 5/2021 | Schlegel et al. | |

FOREIGN PATENT DOCUMENTS

| | | | |
|---|---|---|---|
| CN | 101981329 | 2/2011 | F16B 19/00 |
| CN | 103375460 | 10/2013 | F16B 21/08 |
| CN | 103748367 | 4/2014 | F16B 5/06 |
| CN | 104121264 | 10/2014 | F16B 21/00 |
| DE | 7343790 | 3/1974 | H01R 13/48 |
| DE | 69206597 | 5/1996 | B60R 21/20 |
| DE | 19643708 | 8/2000 | F16B 19/10 |
| DE | 102008060561 | 7/2010 | H05K 5/02 |
| EP | 0379159 | 7/1990 | H05K 9/00 |
| EP | 0731534 | 9/1996 | H01R 13/629 |
| EP | 2194217 | 6/2010 | E05B 13/10 |
| EP | 2259383 | 12/2010 | H01R 13/187 |
| EP | 2733366 | 5/2014 | F16B 21/06 |
| EP | 2746599 | 6/2014 | F16B 21/06 |
| EP | 2801726 | 11/2014 | F16B 21/16 |
| EP | 2602494 | 7/2017 | A61N 1/375 |
| WO | WO 2009126968 | 10/2009 | F16L 39/00 |

OTHER PUBLICATIONS

International Search Report and Written Opinion (w/translations) issued in application No. PCT/DE2018/100693, dated Nov. 19, 2018 (19 pgs).

International Preliminary Report on Patentability (English translation) issued in application No. PCT/DE2018/100693, dated Feb. 27, 2020 (10 pgs).

International Preliminary Report on Patentability (English translation) issued in application No. PCT/DE2018/100978, dated Jun. 16, 2020 (8 pgs).

German Office Action (w/machine translation) issued in application No. 10 2018 101 789.8, dated Dec. 19, 2018 (10 pgs).

German Office Action (w/machine translation) issued in application No. 10 2017 130 005.8, dated Jul. 18, 2018 (7 pgs).

German Office Action (w/machine translation) issued in application No. 10 2017 118 918.1, dated Jun. 28, 2018 (10 pgs).

International Search Report (w/translation) issued in application No. PCT/DE2018/100978, dated Mar. 22, 2019 (5 pgs).

International Search Report (w/translation) issued in application No. PCT/DE2018/100693, dated Nov. 16, 2018 (6 pgs).

International Search Report and Written Opinion (w/translation) issued in application No. PCT/DE2018/100694, dated Nov. 19, 2018 (17 pgs).

International Preliminary Report on Patentability ( English translation) issued in application No. PCT/DE2018/100694, dated Feb. 18, 2020 (8 pgs).

Krause, W., Construction Elements of Precision Engineering (no translation available), vol. 1, 3rd revised edition. Munich: Hanser 2004, pp. 448-449 (3 pgs).

Chinese Office Action issued in Chinese Patent Appln. No. 201880071664.3, dated Feb. 22, 2021, with machine English translation, 10 pages.

Chinese Office Action issued in Chinese Patent Appln. No. 201880053305.5, dated Feb. 3, 2021, with English translation, 12 pages.

(56) References Cited

OTHER PUBLICATIONS

Chinese Office Action issued in Chinese Patent Appln. No. 201880068304.8, dated Mar. 17, 2021, with English translation, 13 pages.
Notice of Allowance issued in U.S. Appl. No. 16/629,503, dated Apr. 11, 2022, 28 pages.

* cited by examiner

LOCKING MECHANISM FOR A PLUG CONNECTOR HOUSING

The invention relates to a locking mechanism for an at least two-part plug connector housing, having a housing upper part comprising side walls and a housing lower part adapted thereto.

In this case, the invention relates, in particular, to a locking mechanism having an actuating mechanism comprising a push button, a locking element in the interior of the plug connector housing being manually actuated thereby from the outside, as well as a housing comprising such a locking mechanism.

Such locking mechanisms are required in order to be able to lock and unlock a plug connector in a convenient manner.

PRIOR ART

Asymmetrical coil springs of annular design are known in the prior art. Occasionally, they are also denoted as "canted coil springs" and/or by the name "Bal Seal spring". In particular, such springs by the US-American firm "Bal Seals Engineering" have become known, amongst other things, from a plurality of patent applications. In the publication EP 0 379 159 B1 based thereon, the design of such an asymmetrical coil spring is described in detail. Moreover, a latching connection by using such a spring according to the ballpoint pen principle is described in the publication EP 2 259 383 B1 of the same applicant.

Moreover, locks for plug connectors are known in the prior art.

The publication EP 0 731 534 B1 discloses an actuatable U-shaped locking shackle which is arranged outside a housing and which is pivotable about bearing pins of a housing half. The U-shaped locking shackle has pockets into which a spring element is inserted in each case. When the locking shackle is closed, these spring elements act on locking pins of the other housing half such that the housing halves are pressed in a resilient manner against one another. Moreover, the use of a locking element in the manner of a toggle lever is disclosed as an advantageous embodiment. By means of this invention high retaining forces are possible with low operating forces.

In the publication DE 10 2008 060 561 A1 a locking device for a two-part housing is disclosed, in which on at least one of two opposing side walls of the housing upper part in each case an actuating button which is able to be operated from outside is arranged inside circular shaped portions. The actuating button is configured as a combined rotary and push button and is in engagement with a spring lever arranged in the interior of the housing upper part. The spring lever effects a latching connection between the two housing parts with a latching lug of one housing part as a function of the position of the actuating button.

A sealing element is not provided between the two housing parts so that, when joined together, the two housing parts are automatically latched by means of the spring lever. By pressing onto the two actuating buttons which are arranged on the opposing side walls on the housing upper part, a latching opening in the spring lever is removed from the latching hook in the housing lower part and the housing upper part may be removed. For an additional locking of the actuating button, the actuating button has to be rotated by 90°, wherein the spring lever is secured to the latching hook by means of a specifically configured mechanical device such that a removal of the housing upper part is not possible.

With the provision of a desirable sealing element between the two housing parts the automatic latching of the housing parts is impaired, since a pressure has to be exerted onto the housing in order to provide the required compression of the sealing element and thus also the latching of the housing halves. This measure is also required in the case of the above-described removal of the spring lever from the latching lug, even with a corresponding inadvertent actuation of the multifunctional actuating button, which is awkward and confusing.

It is further disclosed that the actuating button is arranged inside a circular shaped portion. A circular seal with a colored marking is located therein. The additional locking by means of the actuating button is highlighted by this colored marking which is also perceived by some users as not self-explanatory, since the two joined-together housing parts are already latched and locked together by means of the spring lever even without the additional locking.

Accordingly, a drawback in this prior art is that the operation requires a relatively large effort and is not immediately self-explanatory to everyone and may be confusing. Moreover, the predetermined function of the automatic latching of the housing parts is impaired when a seal is provided between the housing parts.

The German Patent and Trademark Office has researched the following prior art in the priority application 10 2017 130 005.8 of the present application: EP 2 746 599 A2, US 2013/0149031 A1, WO 2009/126968 A1 and U.S. Pat. No. 9,482,255 B2.

Moreover, the German Patent and Trademark Office has researched the following prior art for the priority application 10 2017 118 918.1 of the present application: EP 2 801 726 B1, CN 103 375 460 A, DE 196 43 708 C2 and DE 10 2008 060 561 A1.

In addition, the following non-patent literature has been cited therein: Werner Krause: Construction Elements of Precision Engineering, Vol 1, 3rd revised edition. Munich: Hanser 2004, pages 448-449.

Object

It is accordingly the object of the invention to specify a locking mechanism for a plug connector housing which is convenient and easy to understand in terms of its operation and which is manually actuatable and which, in particular, at the same time permits an effective seal of two locked housing parts.

Moreover, for providing advantageous embodiments of the invention, in particular, techniques for push button locks have been developed which are disclosed in the DE patent applications No. 10 2017 118 918.1 filed on Aug. 18, 2017 with the title "Push button lock for a plug connector housing" (hereinafter denoted as the first push button application) and No. 10 2017 130 005.8 filed on Dec. 14, 2017 with the title "Plug connector" (hereinafter denoted as the second push button application), the full disclosure thereof being expressly cited herein and being incorporated in the disclosure of the present application and the priority thereof being claimed herewith.

The present invention comprises, in particular, a locking mechanism for a first and second housing part for providing a first unlocking position and a second locking position of the two housing parts. The locking mechanism in this case comprises a push button which extends in the axial longitudinal direction thereof from outside through a through-opening of the first housing part into the interior of the housing, wherein the push button is movably arranged, relative to the housing, between a predetermined first and second axial position, each of which corresponds to the first unlocking and the second locking position of the two housing parts.

A locking element is provided in the interior of the housing, wherein the push button and the locking element are designed and arranged such that the push button is in pressure contact with the locking element and cooperates with the locking element such that, in the case of an axial movement of the push button from the first position thereof into the second position thereof, the second locking position of the two housing parts is provided with a radial pressure contact between the two housing parts, such that a gap between the first and second housing part is minimized.

In this manner, by means of a sealing element provided between the two housing parts, in the second locking position of the two housing parts a seal of the locked housing may be provided without impairing the function and handling of the locking mechanism. When joining together the two housing parts, the two housing parts are simply pushed together and both the locking and the sealing are only provided and/or released subsequently thereto by means of the axial movement of the push button which cooperates as described above with the locking element. The locking mechanism in this case is particularly effective and also simple and unambiguous in the handling thereof.

According to a particularly simple embodiment, the locking element may be configured integrally with the second housing part, for example as an eye in the second housing part, into which the push button is pushed, wherein in this case the through-opening through the first housing part, the push button and the eye may comprise corresponding configurations, arrangements and dimensions such that the push button exerts a lever action and pulls together the first and second housing parts radially to the axial movement thereof in the plug-in direction.

According to a preferred embodiment, the locking element may also be configured as an individual element, wherein the push button and/or the locking element may be suitably designed and/or arranged such that by means of the axial movement of the push button from its first position into its second position an axial pressure contact is also provided between the locking element and the second housing part with a particularly stable connection of the two housing parts clamped together in this manner.

An individual locking element of the above embodiment may be suitably designed and arranged such that in the first unlocking position it is in pressure contact with the push button, whereby in the unlocking position of the housing parts the locking element is fixedly retained in the first housing part. This embodiment also has the advantage relative to the above particularly simple embodiment, with the locking element configured integrally with the second housing part, that after separating the two housing parts the locking element together with the other components of the locking mechanism are accommodated in the first housing part and said locking element does not, for example, remain on the second housing part as an eye protruding over the edge thereof.

The locking element may be designed and arranged in the above embodiment as an individual element, such that in the second position of the push button said locking element is in radial pressure contact with the push button and at the same time is also in radial pressure contact with the second housing part, such that a particularly effective and stable radial pressure contact of the two housing parts is provided.

The locking element may also be designed and arranged in the above embodiment as an individual element, such that when the push button is moved into its first or second position the locking element in each case performs an axial and radial pivoting movement. As a result, on the one hand, a deliberate radial and axial pressure contact of the locking element with the second housing part is achieved in the second locking position and, on the other hand, a desirable spacing of the locking element from the second housing part is achieved for a separation of the housing parts in the first unlocking position thereof, which is also particularly suitable for accommodating the locking element remaining in the first housing part.

The locking element in this case, in particular, may be designed to be substantially U-shaped, in the form of a shackle with an elongated shoulder, wherein two parallel limbs extend from the shoulder, in each case a hook being configured at the ends thereof and wherein the limbs form with the shoulder a rounded arcuate portion so that a through-passage is provided. The thickness of the locking element in this case is designed to be flattened by a chamfer from the arcuate portion to its shoulder. In this manner, the push button may extend with its portion arranged in the interior of the housing into the through-passage of the locking element and may be in pressure contact with the arcuate portion of the through-passage so that the shackle-shaped locking element is suspended with its shoulder on the push button.

A particularly suitable push button for the above embodiment of the locking element comprises a push button pin of substantially cylindrical configuration with a cylindrical portion which extends into the interior of the housing and which transitions into a conically tapering portion, so that a contour of the push button which advantageously cooperates with the through-passage and the rounded arcuate portion of the locking element is provided, such that the above-described advantageous pivoting movement of the locking element is performed with a movement of the push button. A push button configured in such a manner is described in detail hereinafter and with reference to the drawings.

A channel may be provided in the first housing part for accommodating and for guiding the movement of the locking element, a spring element and the shoulder of the locking element being arranged therein such that the spring element exerts a radial pressure onto the locking element.

In its path from the shoulder to the arcuate portion of the locking element the channel may have in a suitable manner a widening, such that a rail-like guidance of the locking element which cooperates with the shoulder and the chamfer of the locking element is provided, such that with the movement of the push button the above-described advantageous pivoting movement of the locking element is performed.

For providing the radial pressure of the locking element onto the second housing part and the above-described radial pressure contact of the housing parts with the minimizing of a gap and the provision of a seal between the housing parts, in the second locking position a stepped portion is configured in a suitable manner in the second housing part, the hooks of the locking element engaging therein and in this manner cooperating with the stepped portion.

The conical portion of the push button, when moved from its first unlocking position into its second locking position, with the configuration/contour of the locking element and the rail-like guidance thereof acts as a lever which radially lifts the locking element with its hooks, whereby the hooks in the second locking position in radial pressure contact with the stepped portion of the second housing part provide the above-described advantageous pressure contact of the two housing parts.

In the above-described locking element of a preferred embodiment of the locking mechanism, the shackle-shaped locking element may be designed to be closed at the ends of its limbs, such that advantageously a joined-together capture hook is provided with a closed, eye-shaped, i.e. O-shaped, through-passage.

As described above, the push button of an embodiment of the locking mechanism may suitably provide a cylindrical guide region of the push button pin extending through the through-opening of the first housing part, a tapering conical portion being adjoined thereto in the interior of the housing.

In this case, the push button is suitably arranged and designed, in particular in its dimensions, such that in the first position of the push button the locking element is in radial pressure contact with the conical portion of the push button, by the action of the spring element arranged in the channel. When the push button is moved from the first to the second position of the push button, the locking element with its rounded arcuate portion is then in axial and radial pressure contact with the conical portion of the push button due to the axial pressure moving the push button. In the second position of the push button, the locking element in a suitable manner is only in radial pressure contact with the cylindrical guide region of the push button pin.

For securing the position of the push button in its first and second position, an actuating device may also be particularly advantageously provided with an axial fixing mechanism of the push button in the first and second position.

In this case, the push button according to an advantageous embodiment of the invention may be an element of an actuating device of the locking mechanism, wherein the actuating device may advantageously comprise a fixing mechanism of the push button, which provides a fixing of the push button in its first and second position, wherein the fixing is releasable by axial pressure from outside onto the actuating device. In this manner, it is ensured that the first unlocking position and second locking position of the housing parts, which corresponds to the first and second fixing position of the push button, are not inadvertently released.

In this manner, a locking and unlocking of the two housing parts may be triggered in each case by means of axial pressure from outside onto the actuating device, according to which a locking mechanism of this embodiment may be operated in a particularly simple, convenient and intuitive manner.

An embodiment of an above-described advantageous actuating device for providing a fixing mechanism of the push button may suitably comprise in addition to the push button a plurality of further elements arranged coaxially to the push button in and/or on the through-opening of the first housing part and cooperating with the push button and/or with a contour configured in the through-opening of the first housing part and/or with one another, comprising an unlocking pin, a coil spring and a conical helical spring and comprising at least two locking balls. The aforementioned possible embodiment of an actuating device for providing a fixing mechanism of the push button is detailed in the first push button application and in the following description with reference to the drawings.

A further embodiment of an above-described advantageous actuating device for providing the fixing mechanism of the push button may comprise in a suitable manner in addition to the push button an annular asymmetrical coil spring which is arranged coaxially to the push button pin of the push button and which is arranged in a contour configured in the through-opening of the first housing part, and may also comprise a conical helical spring. In this case, a contour is configured on the push button pin with at least one unlocking groove and/or locking groove and/or retaining groove which cooperates with the asymmetrical coil spring. The push button of the actuating device in this case may be also configured to be rotatable and in this manner cooperate with further elements securing the push button in its position and ensuring its actuation. The above possible embodiment of an actuating device for providing a fixing mechanism of the push button is detailed in the second push button application and in the following description with reference to the drawings.

A housing of a plug connector with a first and second housing part of an embodiment of the invention may comprise at least one above-described embodiment of a locking mechanism, wherein a push button may be designed and arranged such that an actuatable head of the push button in the first unlocking position of the two housing parts is spaced apart from an outer wall of the first housing part and in the second locking position of the housing parts is arranged substantially positively with the outer wall of the first housing part on the through-opening. In this manner, a visual confirmation of the locking status of the locking mechanism is made clear and an arrangement is provided which is simple to handle, convenient and unambiguous.

To this end the housing may comprise in a suitable manner a first and second locking mechanism which are arranged on opposing walls of the housing, wherein the first housing part may be a housing upper part and the second housing part may be a housing lower part of the plug connector.

For the sake of completeness it should be mentioned that the locking mechanism is particularly suitable for a lockable plug connector, wherein in a particularly preferred embodiment the plug connector housing has at least one contact support fixed in the plug connector housing. At least one contact, which is also denoted as an insulating body, is arranged in the contact support. In particular, in this case it is an electrical and/or optical and/or pneumatic contact. For example, such a contact has a plug region and a cable connecting region. This cable connecting region serves for supplying the contacts with corresponding digital and/or analog signals and/or with energy. Moreover, at least one cable insertion opening for inserting an electrical and/or optical and/or hydraulic cable may be arranged in the plug connector housing.

In particular, the plug connector may comprise means for fixing the inserted cable, for example a cable screw connection. On the plug side, the plug connector, amongst other things, is provided by a corresponding plug opening and in particular by a corresponding so-called "plug face" for plugging into a corresponding mating plug connector, for example for the transmission of signals and/or energy. The plug connector may also comprise a separate so-called "retaining frame" and/or a similarly acting retaining mechanism fixedly integrated in the plug connector as well as a plurality of insulating bodies arranged therein in the form of so-called "plug connector modules". Moreover, the plug connector may consist at least partially of metal and may be designed for high currents and/or voltages, i.e. for example currents of more than 50 amperes, in particular more than 100 amperes, preferably currents of more than 250 amperes, in particular currents of more than 500 amperes. Alternatively or additionally, voltages of over 60 V, in particular of over 220 V, for example of over 600 V and also voltages of over 1000 V may be transmitted via such a plug connector. For the earth protection, the plug connector may have at least one PE (protection-earth) contact, for example in the form of a PE screw.

Preferably, the plug connector is a rectangular plug connector. The plug connector housing may have, therefore, two broad sides opposing one another in parallel and two narrow sides opposing one another in parallel at right angles thereto. Moreover, the plug connector housing may have two through-openings, preferably in each case one thereof being arranged in each of the two narrow sides. The plug connector may also have two push buttons with the corresponding fixing mechanism, wherein each of the two push buttons with its push button axis and in each case a fixing mechanism is respectively arranged in one of the through-bores. This has the advantage of simplified operation since for the locking procedure the two push buttons only have to be moved toward one another, i.e. they may be advantageously pushed together by the user with one hand. This type of operation may also be particularly advantageously automated, for example by a corresponding electromechanical device. In this manner, for example, "unplugging under load" may also be prevented.

BRIEF DESCRIPTION OF THE DRAWINGS

Exemplary embodiments of the invention are shown in the drawings and described in more detail hereinafter. In the drawings:

FIG. 2b shows a modification of the locking element of FIG. 2a;

FIG. 3b shows a section of a through-opening of a housing part suitable for the actuating device of FIG. 3a;

FIG. 3c shows a section through the push button of FIG. 3a;

FIG. 3d shows an enlarged view of the unlocking pin of FIG. 3a;

FIG. 5a shows a state of the operation of the locking mechanism of FIG. 4a;

FIG. 5b shows a further state of the operation of the locking mechanism of FIG. 4a;

FIGS. 7b and c show a conical helical spring of the actuating device of FIG. 7a;

FIG. 7d shows an enlarged view of the push button of FIG. 7a;

FIG. 7e shows a section of a through-opening of a housing part suitable for the actuating device of FIG. 7a;

FIGS. 8a to f show the procedure for locking and unlocking a locking mechanism according to the invention in the section through the actuating device of FIG. 7a;

The figures contain partially simplified schematic views. In some cases, identical reference numerals are used for the same but optionally non-identical elements. Different views of the same elements could be scaled differently.

DETAILED DESCRIPTION OF THE INVENTION

Figure 1A:
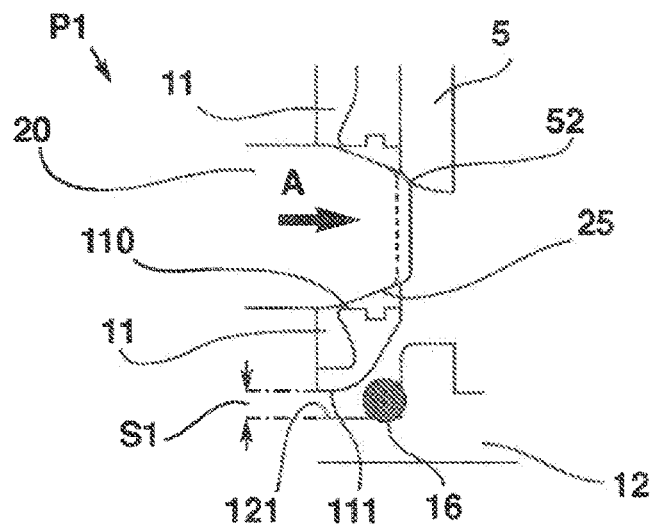
FIG. 1a shows a schematic view of a basic idea of the invention with a section through a locking mechanism according to an embodiment of the invention in the unlocking position.
Figure 1B:
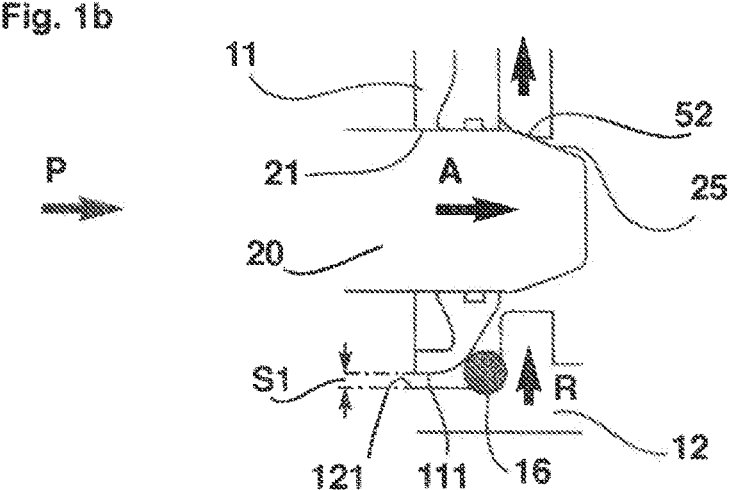
FIG. 1b shows the operation of the locking mechanism of FIG. 1a from the unlocking position of FIG. 1a into the locking position of FIG. 1c.
Figure 1C:
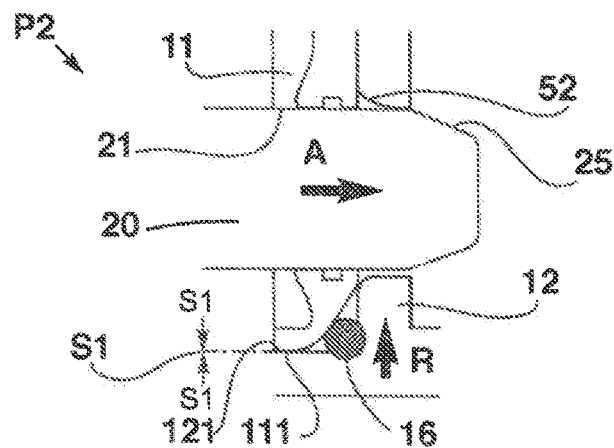
FIG. 1c shows the locking mechanism of FIG. 1a in the locking position.

Viewing FIGS. 1a, 1b and 1c together shows a schematic view of a basic idea of the invention with a section through a locking mechanism according to an embodiment of the invention, in FIG. 1a in a first unlocking position P1 and in FIG. 1b the operation of the locking mechanism of FIG. 1a from the unlocking position P1 of FIG. 1a into the locking position P2 of FIG. 1c.

A portion of an axial A elongated push button 20, extending through a through-opening 110 of a first housing part 11 arranged on the second housing part 12, protrudes in FIG. 1a in the unlocking position P1 by a predetermined amount into the interior of the housing made up of the two housing parts 11, 12. In this case, a particularly simple embodiment in which a locking element 5 arranged in the interior of the housing is integral with a second housing part 12 is shown in FIG. 1a, viewed together with a preferred embodiment of an individual locking element 5.

In the simple embodiment, the locking element 5 may be an upper edge of an eye, the further path thereof and the connection thereof with the second housing part 12 not being shown for the sake of simplicity and clarity. The difference of the simple integral embodiment is illustrated by the different position of the end of the push button 20, which is shown in dashed lines for the simple integral embodiment and is shown in solid lines for the embodiment with the individual locking element 5.

In the simple integral embodiment, the end of the push button 20 is in the unlocking position P1 of FIG. 1a at a position which does not impair a separation of the two housing parts 11, 12, whilst in the embodiment with the individual locking element 5 the end of the push button 20 extends by a predetermined amount into the housing, so that the locking element 5 is in contact with the push button 20 and is supported thereby.

Otherwise, the simple integrated embodiment and the embodiment with the individual locking element 5 do not differ in the highly schematic drawing of FIGS. 1a, b and c. An individually configured locking element 5 may be mounted and guided in the first housing part 11 in a manner not shown in the drawings and then may be hooked, for example, or cooperate otherwise with the second housing part 12. An example of a preferred embodiment of an individually configured locking element 5 is described hereinafter with reference to FIGS. 4 and 5.

A sealing element 16 is arranged in a gap S1 between the adjacent edges 111 and 121 of the housing parts 11, 12 which are combined together in their unlocking position P1.

The elongated push button 20 extending through the through-opening 110 of the first housing part 11 has a substantially cylindrically configured push button pin 21 which extends with a cylindrical guide region through the through-opening 110 and a conically tapering portion 25 being adjoined thereto in the interior of the housing. The cylindrical guide region of the push button pin 21 corresponds to the dimensions of the through-opening 110 and serves for absorbing force for the lever action of the push button 20 which is movable under an axial A pressure P into the interior of the housing, the conical portion 25 thereof cooperating with a chamfered and/or rounded contour 52 and/or rounding or chamfer 52 of the locking element 5, such that the two housing parts 11, 12 are pushed relative to one another by a radial pressure R. In this case, the push button 20 and the locking element 5 are in radial R and axial A pressure contact. This state of the provision of a locking of the two housing parts 11, 12 is shown in FIG. 1b.

FIG. 1c shows the locking mechanism of FIGS. 1a and b in the locking position P2, in which the push button 20 in its static second position protrudes into the interior of the housing so that the locking element 5, in contrast to the case of axial A movement of the push button 20, is merely in radial R pressure contact with the cylindrical guide region of the push button pin 21. Moreover, in the locking position P2 of the two housing parts 11, 12 the gap S1 between the two housing parts 11, 12 is minimized and a seal of the housing parts 11, 12 is provided by means of the sealing element 16. In this case, a desirable radial R pressure contact is provided between the first 11 and the second 12 housing part and the sealing element 16.

Figure 2A:
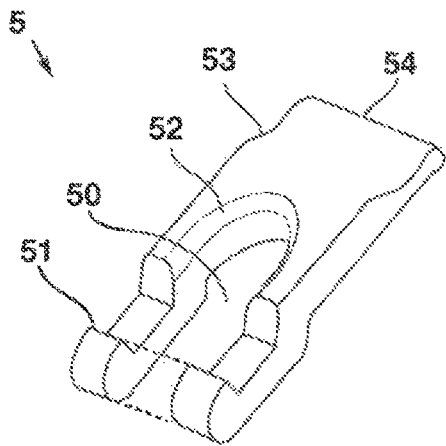
FIG. 2a shows a perspective view of a locking element according to an embodiment of the invention.

FIG. 2a shows a perspective view of a locking element 5 according to an embodiment of the invention. The flat U-shaped locking element 5 which substantially extends in one plane and which is configured in the form of a shackle has an elongated rounded shoulder 54 from which two parallel limbs extend, in each case a hook 51 being configured at the ends thereof. The two limbs form a rounded arcuate portion 52 so that a through-passage 50 is provided, according to which the arcuate portion 52 of the locking element 5 which is configured symmetrically is thus suitable for suspending the locking element 5. The thickness of the locking element 5 reduces from its arcuate portion 52 to its shoulder 54 via a chamfer 53.

Figure 2B:
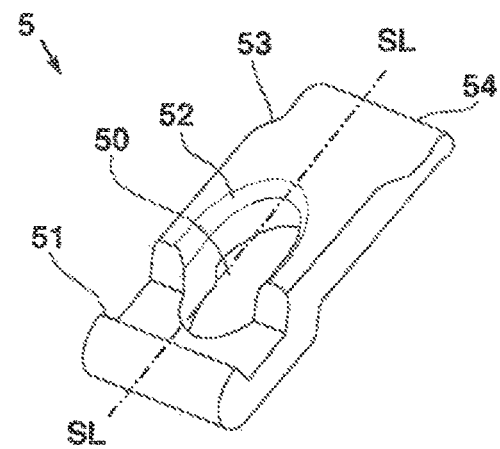

FIG. 2b shows a modification of the locking element 5 of FIG. 2a in which the shackle-shaped locking element 5 is closed on the ends of its limbs so that a joined-together hook 51 is provided, according to which the locking element 5 of FIG. 2a is configured in the shape of an eye with the through-passage 50.

Figure 2C:
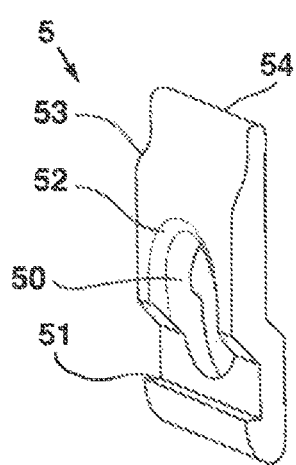
FIGS. 2c and d show the locking element of FIG. 2b in each case from further perspectives.
Figure 2D:
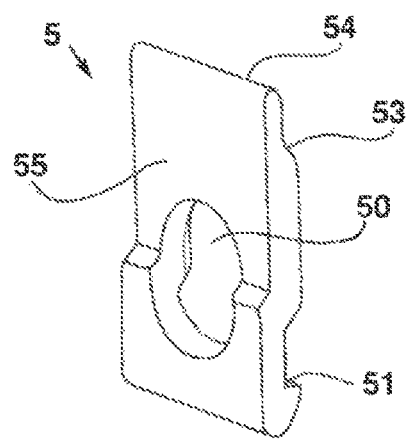
Figure 2E:
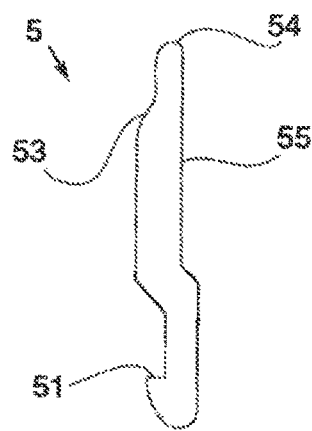
FIG. 2e shows a side view of the locking element of FIG. 2b.
Figure 2F:
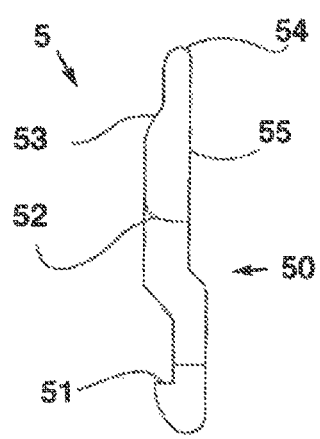
FIG. 2f shows a section through the locking element of FIG. 2b along the line SL-SL of FIG. 2b.

FIGS. 2c and d show for further clarification and illustration the locking element 5 of FIG. 2b in each case from further perspectives and FIGS. 2e and f in each case show a side view and a section through the locking element 5 of FIG. 2b along the line SL-SL of FIG. 2b, according to which the locking element 5 on its side opposing the rounded arcuate portion 52 and the chamfer 53 has a flat plane 55.

The shackle-shaped locking element 5 configured substantially in one plane, with the elongated shoulder 54, the hook(s) 51 and the through-passage 50, with the contour of its rounded arcuate portion 52, the chamfer 53 and the rounded shoulder 54 and with the flat plane 55 configured on the opposing side of the arcuate portion 52 and the chamfer 53, is particularly suitable for being accommodated in a channel 15 which is configured in the first housing part 11, and which also accommodates a radial R spring element 45 and has a widening 150 in its path from the shoulder 54 to the arcuate portion 52. A detailed description of the cooperation of the contour of the channel 15 with its widening 150 and the contour of the arcuate portion 52 having the chamfer 53 toward the rounded shoulder 54 of an embodiment of the invention follows with reference to FIGS. 4 and 5.

Figure 3A:
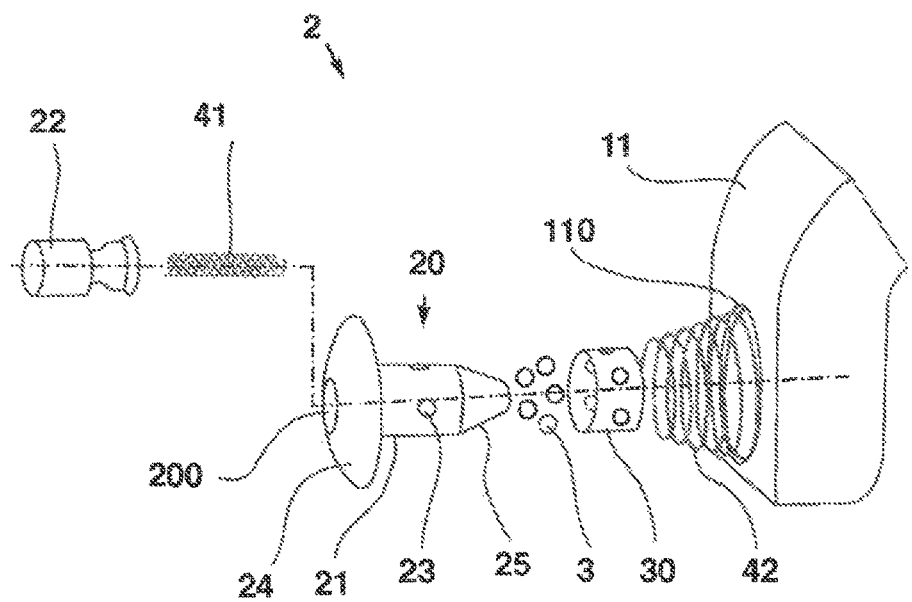
FIG. 3a shows an exploded view of an actuating device suitable for a locking mechanism according to the invention with a push button and an unlocking pin and further elements.

FIG. 3a shows in a perspective exploded view an embodiment of an actuating device 2 which is suitable for a locking mechanism according to the invention. The actuating device 2 is suitable for the arrangement thereof in a through-opening 110 of the first housing part 11 and comprises a fixing mechanism of the push button 20 which provides a releasable fixing of the push button 20 in a first F1 and second F2 position by axial A pressure P onto the actuating device 2, which in each case corresponds to the first unlocking position P1 and the second locking position P2, and the mode of operation thereof is described hereinafter with reference to FIGS. 4 and 5. The actuating device 2 of the embodiment of FIG. 3a also corresponds to the push button lock described in detail in the "first push button application".

Figure 3B:
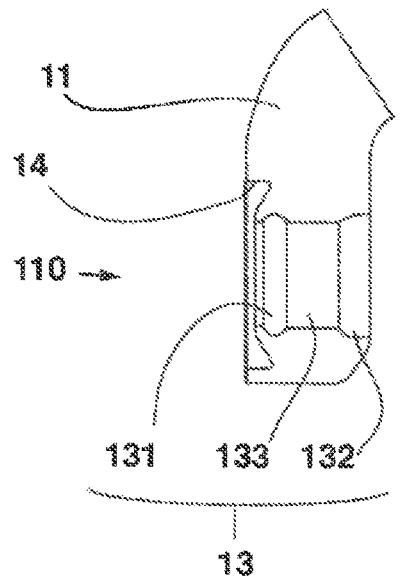
Figure 3C:
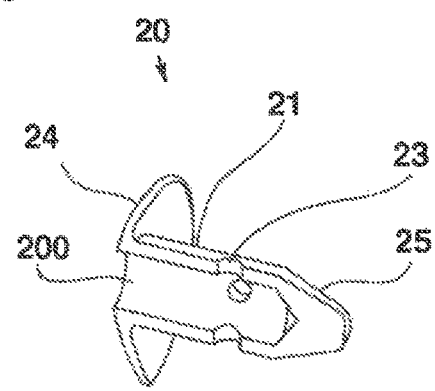
Figure 3D:
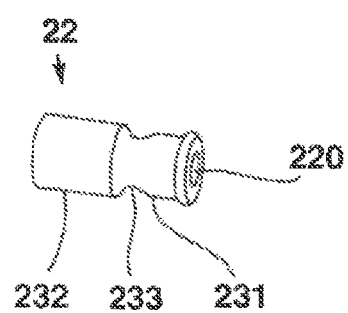

FIG. 3b shows a section through the housing part 11 with the through-opening 110 of FIG. 3a, FIG. 3c shows a section through the push button 20 of FIG. 3a and FIG. 3d shows an enlarged view of the unlocking pin 22 of FIG. 3a.

The actuating device 2 for providing the fixing mechanism of the push button 20 comprises, in addition to the push button 20, the unlocking pin 22, a coil spring 41, a conical helical spring 42, for example five locking balls 3 and a ball cage 30, which are arranged so as to be mounted coaxially together with the push button 20 in and/or on the through-opening 110 of the housing part 11.

The push button 20 comprises a substantially cylindrically configured push button pin 21 with a cylindrical guide region, a head 24 being arranged at the one end thereof for actuating the actuating device 2 by means of the push button 20, and a conically tapering portion 25 adjoining the other end thereof. Bores 23 are configured in the cylindrical guide region of the push button pin 21 for receiving the locking balls 3 and a central axial opening 200 is configured therein for accommodating the unlocking pin 22 and the coil spring 41.

The substantially cylindrically configured unlocking pin 22 comprises a cylindrical portion 232, to which an unlocking recess 233 and a restoring chamfer 231 with a retaining region for the locking balls 3 are adjoined, and a central axial receiving recess 220 for the coil spring 41. The restoring chamfer 231 in this case has at its end a retaining region which is also suitable for receiving the locking balls 3.

The coil spring 41 arranged in the receiving recess 220 of the unlocking pin 22 is arranged, during the mounting of the actuating device 2, together with the unlocking pin 22 in the opening 200 of the push button 20, such that the coil spring 41 exerts an axial A pressure onto the unlocking pin 22 in the direction of the head 24 of the push button 20. It is clear that a stop, not shown, may be provided here for the unlocking pin 22 or other measures may be provided which prevent the unlocking pin 22 from being pushed out of the push button 20.

The locking balls 3 are accommodated in the bores 23 of the push button 20 and may be retained in the push button 20 by the annular ball cage 30 which is provided with bores of correspondingly smaller diameter and which is correspondingly arranged on the push button 20. In place of the ball cage 30 the locking balls 3 may also be stamped after the insertion thereof into the bores 23 and in this manner protected from falling out of the bores 23.

The push button 20, which is provided as described above with the unlocking pin 22, the coil spring 41 and the locking balls 3, is arranged together with the conical helical spring 42 on and/or in the through-opening 110 described below, wherein the conical helical spring 42 is arranged in a receiver 14 on the outer edge of the housing part 11 and is also arranged on the head 24 of the push button 20, so that by means of the conical helical spring 42 an axial A outwardly oriented compressive force is exerted on the push button 20.

The through-opening 110 comprises on the outer edge of the housing part 11 the receiver 14 for the conical helical spring 42 and in its path extending into the interior of the housing part 11 a contour 13 with a first fixing recess 131, a guide region 133 and a second fixing recess 132. The first 131 and the second 132 fixing recess in each case may be accommodated in locking balls 3 arranged in the bores 23 of the push button 20, wherein the respective accommodation of the locking balls 3 in the first 131 and second 132 fixing recess in each case corresponds to a first F1 and second F2 fixing axial A position of the push button 20 in the through-opening 110, which is described hereinafter with reference to FIGS. 4 and 5.

Figure 4A:
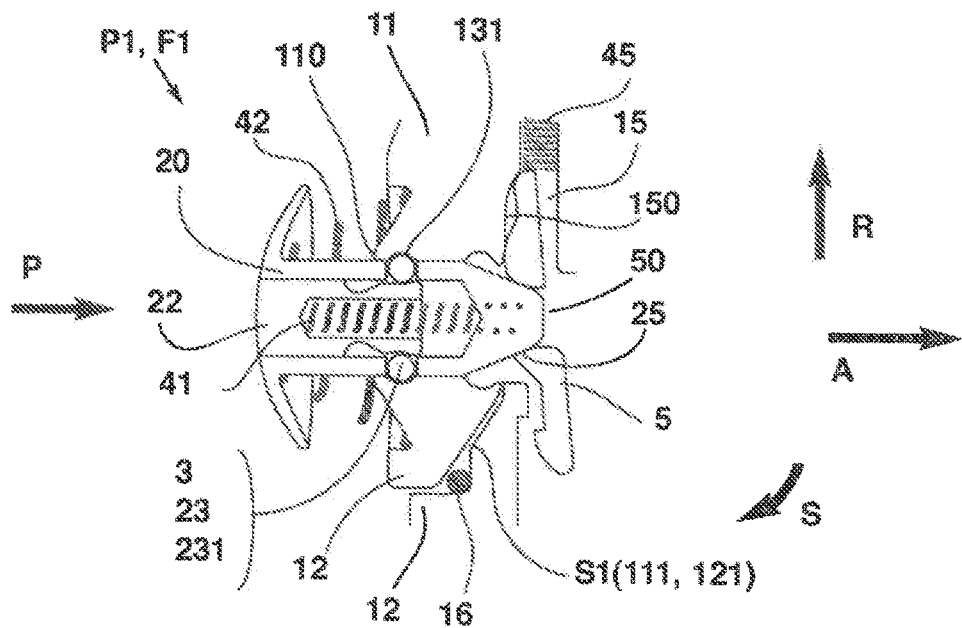
FIG. 4a shows a section through a locking mechanism according to an embodiment of the invention with the locking element of FIG. 2b and the actuating device of FIG. 3a in the unlocking position.
Figure 4B:
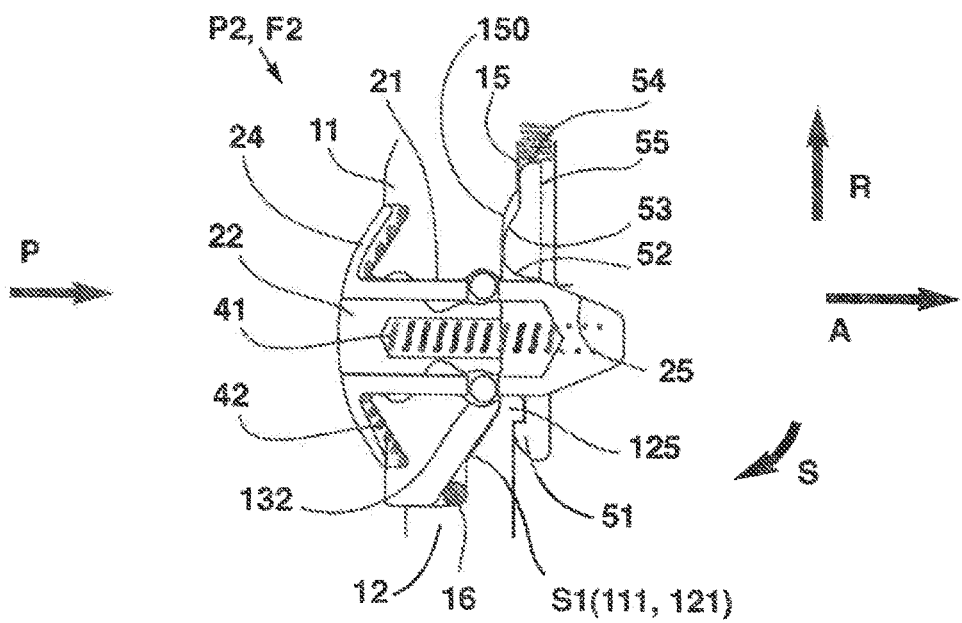
FIG. 4b shows the locking mechanism of FIG. 4a in the locking position.

FIG. 4a shows a section through a locking mechanism according to an embodiment of the invention with the locking element 5 of FIG. 2b and the actuating device 2 of FIG. 3a in the first unlocking position P1, of the two housing parts 11, 12, which corresponds to a first fixing position F1 of the push button 20 of the actuating device 2 and FIG. 4b shows the locking mechanism of FIG. 4a in a second locking position P2 of the two housing parts 11, 12 which corresponds to a second fixing position F2 of the push button 20 of the actuating device 2.

The push button 20 is arranged in the first fixing position F1 of FIG. 4a in the through-opening 110 of the first housing part 11, its head 24 is spaced apart by the axial pressure of the conical helical spring 42 from the outer wall of the first housing part 11 and the locking balls 3 are pushed in the locking opening 23 of the push button 20 by the unlocking pin 22 which is pushed by the conical helical spring 42 in the direction of the head 24, by means of the retaining region of the restoring chamfer 231 radially R into the first fixing recess 131 of the contour 13 of the through-opening 110, so that the push button 20 is retained in this first fixing position F1.

The push button pin 21 of the push button 20 extends into the interior of the first housing part 11 in which the channel 15 is configured with the widening 150. A spring element 45 configured as a coil spring and the shoulder 54 of the locking element 5 are arranged in the channel 15, wherein the spring element 45 exerts a radial R pressure onto the locking element 5.

The conically tapering portion 25 of the push button 20 protrudes by a predetermined amount into the interior of the first housing part 11 and extends into the through-passage 50 of the locking element 5, wherein the conical portion 25 of the fixed push button 20 is in radial R pressure contact with the arcuate portion 52 of the locking element 5 and the locking element 5 is thus retained and accommodated fixedly by the push button 20 at its position in the first housing part 11.

The hook 51 of the locking element 5 is spaced apart from a stepped portion 125 which is configured on the second housing part 12, so that the first housing part 11 may be removed from the second housing part 12, wherein the entire locking mechanism with the actuating device 2 and the locking element 5 remains in the first housing part 11. A sealing element 16 is provided in the gap S1 between the adjacent edges 111 and 121 of the two housing parts 11, 12.

The push button 20 is also arranged in the second fixing position F2 of FIG. 4b in the through-opening 110 of the first housing part 11 and together with the unlocking pin 22 has already been pushed into the interior of the first housing part 11 by the action of an external axial A pressure P. In this case, the coil spring 42 is compressed by the axial A pressure P and the head 24 of the push button 20 is substantially positively arranged with the outer wall of the first housing part on the through-opening 110. Whilst the compressed conical helical spring 42 outwardly pushes the head 24 axially A, the push button 20 remains in its second fixing position F2 after the locking balls 3, which are arranged in the second fixing recess 132, retain the push button 20 in this axial A position F2.

The conical portion 25 of the push button 20 extends through the through-passage 50 of the locking element 5, the arcuate portion 52 thereof bearing against the cylindrical guide region of the push button pin 21. In this case, the locking element 5 is pushed counter to the pressure of the spring element 45 with its shoulder 54 into the channel 15, whereupon the arcuate portion 52 is in radial R pressure contact with the cylindrical guide region of the push button pin 21.

The locking element 5 has carried out a pivoting movement S with its movement from the first unlocking position P1 into the second locking position P2 by the action of an external axial A pressure P onto the push button 20 due to the cooperation of the channel 15 and its widening 150 with the rounded shoulder 54 and the chamfer 53 of the locking element 5 and due to the cooperation of the conical portion 25 of the push button 20 with the rounded arcuate portion 52 of the locking element 5, whereupon the hook 51 of the locking element 5 cooperates with the stepped portion 125 of the second housing part 12 in the second locking position P2 such that a radial R pressure contact is provided between the two housing parts 11, 12 and/or the sealing element 16. In this case, an axial A pressure contact of the locking element 5 is also provided with the second housing part 12 and the gap minimized between the adjacent edges 111, 121 of the housing parts 11, 12.

With the above pivoting movement S the channel 15 provides with its widening 150 a rail-like guidance for the locking element 5.

Figure 5A:
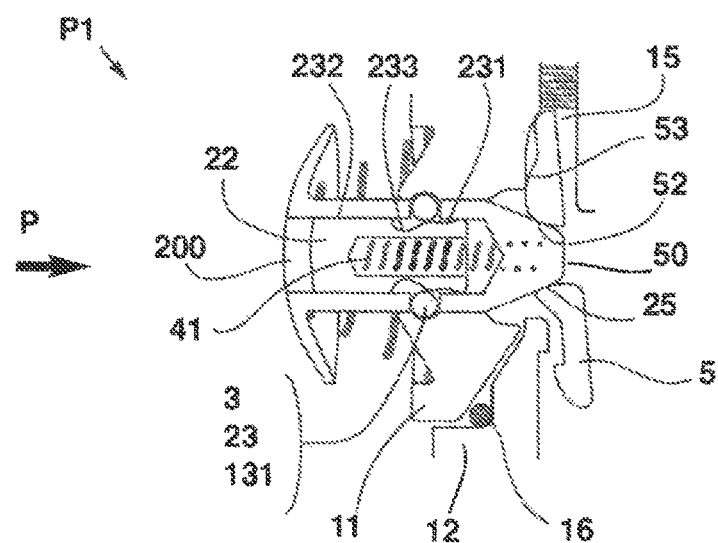
Figure 5B:
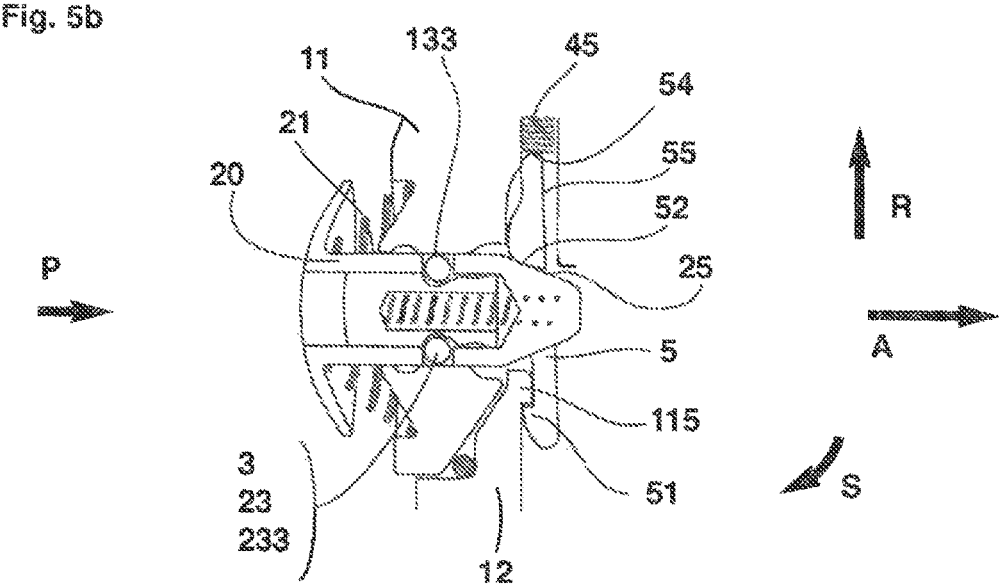

FIG. 5a shows a state of the operation of the locking mechanism of FIGS. 4a and 4b and FIG. 5b shows a further state of the operation of the locking mechanism of FIGS. 4a and b.

The axial A position of the push button 20 of FIG. 5 corresponds to the axial A position of the push button 20 of FIG. 4a, which is why relative to the arrangement thereof and the arrangement of the locking element 5 reference is made to the above description of FIG. 4a. In contrast to the first fixing position F1 of the push button 20 by the action of an external axial A pressure P counter to the pressure of the coil spring 41 the unlocking pin 22 is pushed in the opening 200 of the push button such that the locking balls 3 are still arranged in the first fixing recess 131 of the contour 13.

In a state of FIG. 5b, subsequent to the operating state described above, the unlocking pin 22 and the push button 20 are pushed further into the interior of the through-opening 110 by the further action of an axial A pressure P on the unlocking pin 22 and the push button 20 counter to the pressure of the springs 41 and 42. In this case, the locking balls 3 released by the unlocking pin 22 and received by the unlocking recess 233 thereof, permit a movement of the push button pin 21 of the push button 20 with its cylindrical guide region along the guide region 133 of the through-opening 110. In this case, the above-described pivoting movement S of the locking element 5 is initiated, in each case with its contours said locking element cooperating with the contours of the channel 15 and the cylindrical portion 25 of the push button 20, wherein the second fixing position F2 of the push button 20 and the second locking position P2 of the two housing parts 11, 12 of FIG. 4b are provided after a further axial A movement of the push button 20.

In a similar manner, the push button 20 is unlocked by the action of an axial A pressure onto the unlocking pin 22, for releasing the locking balls 3 from their second fixing recess 132, so that the first unlocking position P1 of the housing parts 11, 12 is permitted with the first fixing position F1 of the push button 20 and is provided by means of the axial pressure of the springs 41 and 42.

Figure 6A:
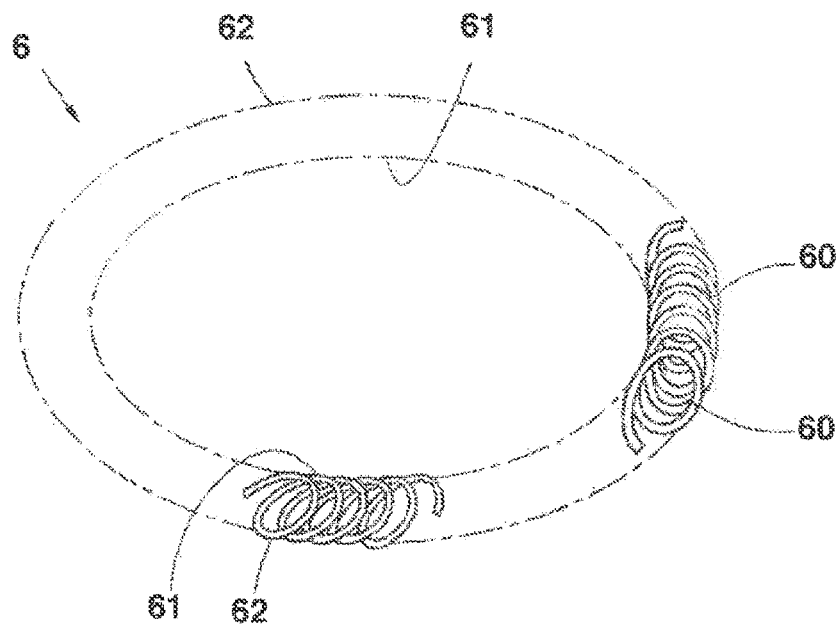
FIG. 6a shows an asymmetrical coil spring of annular configuration corresponding to the prior art.
Figure 6B:
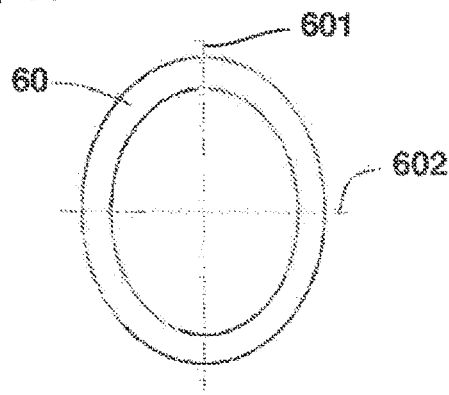
FIGS. 6b and c show the coil spring of FIG. 6a in two further different views.
Figure 6C:
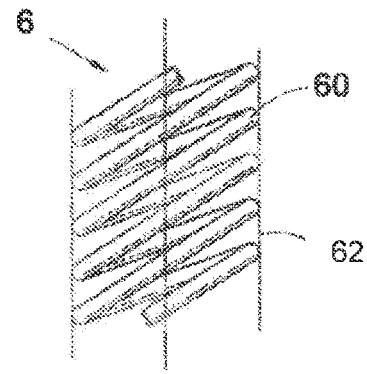
FIG. 6d shows a locking and unlocking application of the coil spring of FIGS. 6a to c corresponding to the prior art.

FIGS. 6a to c show an asymmetrical coil spring 6 of annular configuration, corresponding to the prior art. In FIG. 6a the coil spring 6 is only partially shown in its real shape; however it actually runs in the shape of a closed ring which is indicated in the drawing by means of a dashed-dotted line. The individual coils 60 have in each case an oval shape with a major axis 601 and a minor axis 602 which are shown and denoted in FIG. 6b. FIG. 6c shows the coil spring 6 in a side view. In this case a highly oblique position may be clearly identified relative to the ring plane.

Figure 6D:
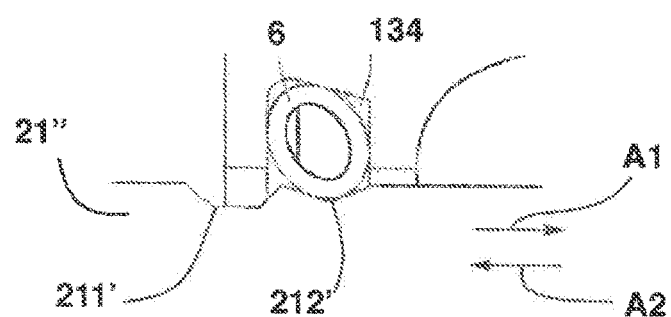

FIG. 6d shows a locking and unlocking application of such a coil spring 6 corresponding to the prior art.

A mechanical connector shown at least partially therein has a push button pin 21" arranged in a through-opening 110' of a housing part 11. The through-opening 110' has a housing groove 134 with the asymmetrical coil spring 6 arranged therein. The push button pin 21" has two grooves, namely a locking groove 212' and an unlocking groove 211'. The coil spring 6 is retained by the housing groove 134 and the locking groove 212' in a locking orientation, i.e. its major axis 601 is inclined to the left in the drawing. The unlocking groove 211' of the push button pin 21" serves to receive the tilted coil spring 6 at a second rotational angle when the push button pin 21" is inserted deeper into the housing part 11 in a first movement direction A1.

In principle, the coil spring 6 may adopt at least two orientations. In its locking orientation, an insertion of the push button pin 21" into the housing part 11 is possible in the first movement direction A1. At the same time, the coil spring 6 in this locking orientation prevents a removal of the push button pin 21" counter to the insertion direction from the housing 11'. In other words, a movement of the push button pin 21" is prevented in a second movement direction A2, wherein the second movement direction A2 opposes the first movement direction A1.

In contrast thereto, in an unlocking orientation of the coil spring 6 the removal of the push button pin 21" from the housing part 11 is permitted counter to the insertion direction, i.e. in the second movement direction A2. At the same time a deeper insertion in the first movement direction A1 is prevented.

Figure 7A:
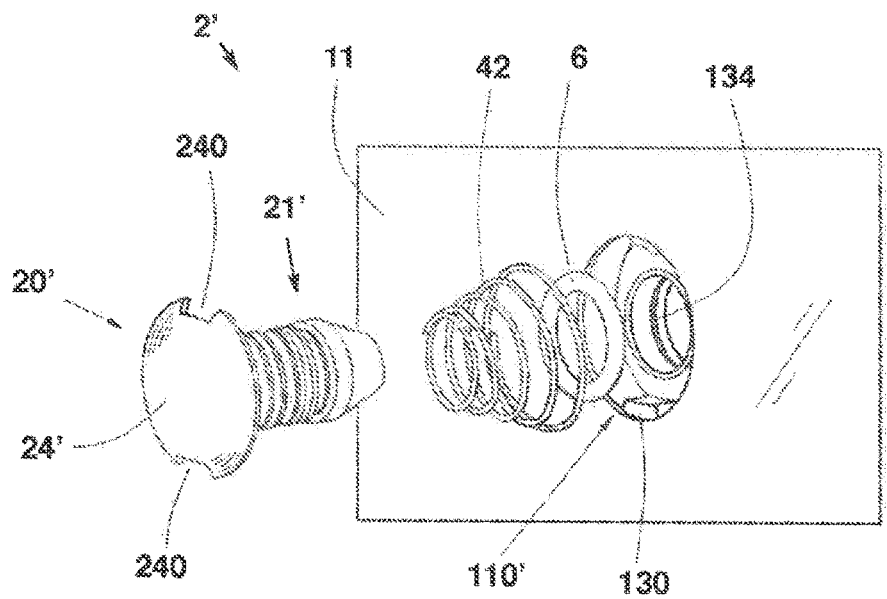
FIG. 7a shows an exploded view of an actuating device suitable for a locking mechanism according to the invention with a push button and the coil spring of FIGS. 6a to c and further elements.

FIG. 7a shows in a perspective exploded view an embodiment of an actuating device 2' which is suitable for a locking mechanism according to the invention. For this actuating device 2' the partially-shown housing part 11 has a through-opening 110'. Moreover, the actuating device 2' has a fixing mechanism for fixing a push button 20' in a first unlocking and/or fixing position F1, P1 and a second locking and/or fixing position F2, P2 with an asymmetrical coil spring 6, which is shown here only schematically, a further spring element, which is a conical helical spring 42, and a push button pin 21'.

Figure 7B:
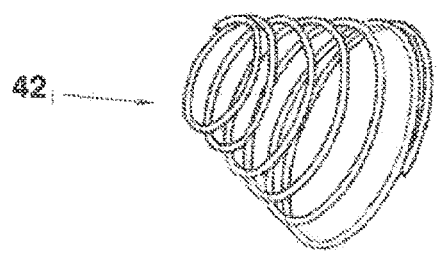
Figure 7C:
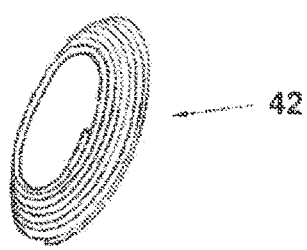

FIGS. 7b and 7c show the conical helical spring 42 in the relaxed and the compressed state. The conical helical spring 42 serves to exert on the inserted push button 20' a corresponding restoring force in order to push it back out of the housing part 11, optionally for the unlocking procedure.

Figure 7D:
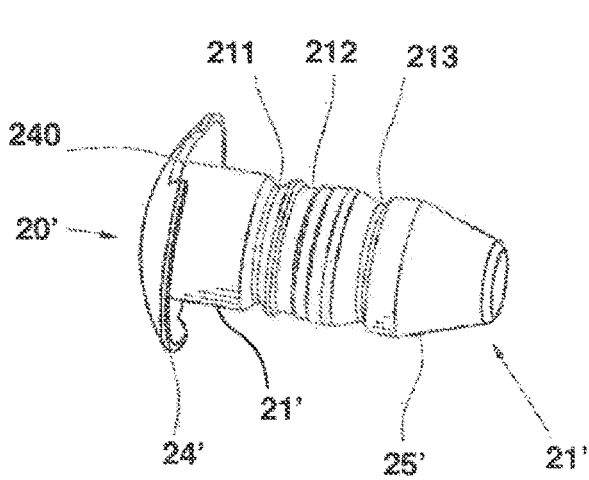

FIG. 7d shows the push button 20' in detail. The push button 20' has at one end a substantially plate-shaped push button head 24'. Opposite the push button head 24' the push button 20' has a free end which has a conical path 25'. Two polarization recesses 240 opposing one another are arranged at the edge of the push button 24'. The substantially cylindrically configured push button pin 21' adjoins the push button head 24'. In each case, an unlocking groove 211, a locking groove 212 and a retaining groove 213 are arranged so as to circulate around the push button pin 21'. The unlocking groove 211 and the retaining groove 213 are in each case deeper than the locking groove 212.

Figure 7E:
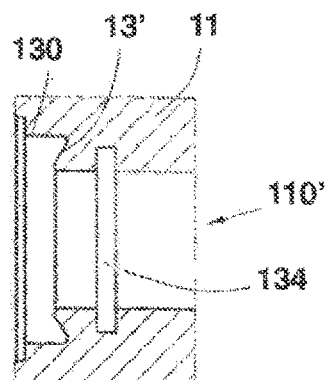

FIG. 7e shows the through-opening 110' which is configured in the housing part 11. Two polarization pins 130 opposing one another are arranged therein for cooperating with the push button head 24', in particular with the polarization recesses 240 arranged therein.

The mounted push button 20', starting from its unlocked retaining position, may be initially inserted only by a first distance into the housing part 11 through the polarization pins 130, until its push button head 24' bears against the polarization pins 130. In this state the push button 20' is located opposite the housing part 11 in its locking location and additionally in its locking position. In order to be able to push the push button 20' by a further additional second distance into the housing part 11, initially it is necessary to rotate the push button 20' from its locking position into its unlocking position, i.e. to move the polarization recesses 240 of the push button head 24' by rotating the push button 20' about the axis of symmetry of its push button pin 21' into the vicinity of the polarization pins 130, so that the polarization recesses 240 encompass the polarization pins 130 when pushed-in further, which is permitted thereby. Adjacent to the polarization pins 130 the housing part 11 has in its through-opening 110' an internal contour 13' in the form of a concentric annular tapering. If the push button 20' is already inserted by the second distance, the push button 20' is ultimately prevented at least indirectly from being inserted more deeply by this internal contour 13'. In the present example, finally the further spring element, namely the conical helical spring 42, is arranged between the push button head 24' and the internal contour 13' and is finally compressed to a maximum extent by the further pushing-in of the push button 20'. In this position, the push button 20' is inserted as deeply as possible into the plug connector housing 11.

At the same time, the asymmetrical coil spring 6 arranged with its outer region 62 in a housing groove 134 of the internal contour 13' of the through-opening 110' may penetrate with its internal region 61 into the unlocking groove 211 of the push button pin 21', therefore, in order to tilt into its unlocking position and to permit an unlocking in cooperation with the conical helical spring 42. FIGS. 8a to 8d and FIGS. 9a and b illustrate this process in a sectional view, wherein hereinafter with reference to FIGS. 8a to 8f the mode of operation in particular of the fixing mechanism of the actuating device 2' of a locking mechanism according to the invention, for illustrating the fixing mechanism, is only shown together with a through-opening 110' in a first housing part 11 and without a second housing part 12 and a locking element 5 cooperating with the push button 20' according to FIG. 2 and FIG. 4.

Figure 8A:
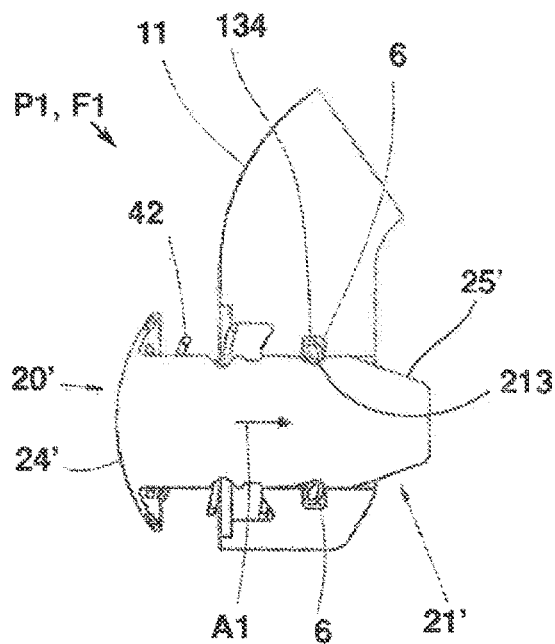
Figure 8B:
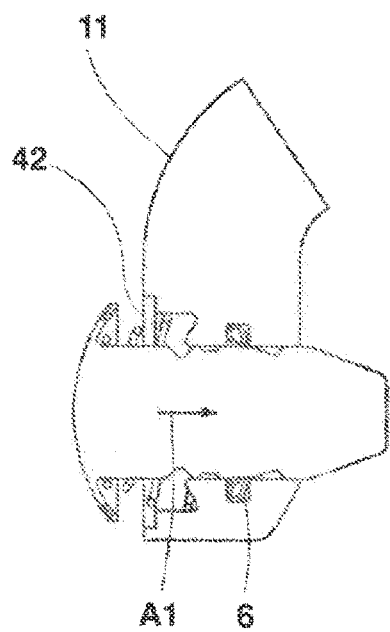

FIG. 8a shows the push button 20' which is initially intended to be inserted from its retained position, shown therein, with its push button pin 21' in the insertion direction deeper into the through-opening 110' of the housing part 11. The annular asymmetrical coil spring 6 is arranged with its outer region 61 in the housing groove 134 of the through-opening 110'. In this case it is oriented in its locking orientation and/or fixing orientation, and thus only permits a movement of the push button 20' in a first movement direction A1, namely in the insertion direction, but prevents a movement in a second movement direction A2, which opposes the first movement direction A1. In the first fixing position F1 and/or retained position shown of the push button 20', which corresponds to a first unlocking position P1 of the housing part 11 of a locking mechanism, not shown here, the coil spring 6 in this position of the push button 20' is arranged with its internal region 61 in the retaining groove 213. In principle, in this position said coil spring may be oriented both in its locking orientation and/or fixing orientation and in its unlocking orientation, since it could tilt by a corresponding movement of the push button 20' between these two orientations. However, even with the adoption of its locking orientation at least a significant force is required in order to remove the push button 20' from the housing part 11, so that this may not occur inadvertently. In the present example, however, the coil spring 6 is shown in its locking direction, and thus easily permits a deeper insertion of the push button 20' into the housing part 11 as shown in FIG. 8b.

Figure 8C:
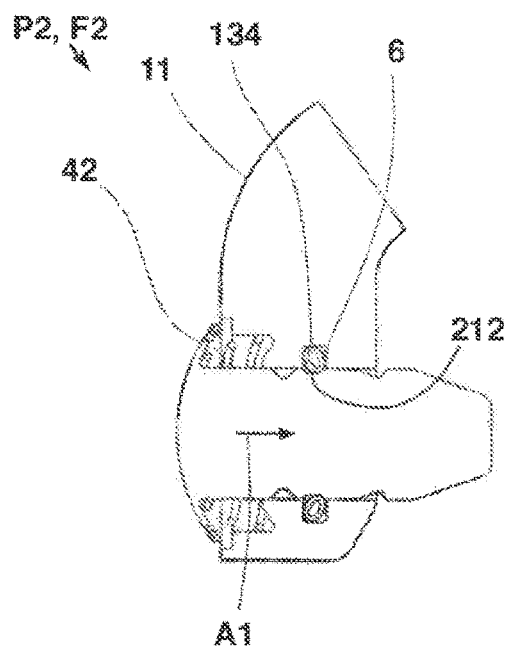

In FIG. 8c it is shown how the push button 20' is inserted by a first distance into the housing part 11, whereby the coil spring 6 with its internal region 61 engages in the locking groove 212. The push button 20' is further secured against being pulled out from the plug connector housing 11 by the locking groove 212. The push button 20' in this case is located in a position P2 locking the housing part 11 with the locking mechanism, not shown here, and also in a corresponding fixing position F2 of the push button 20', i.e. the push button 20' in this position may lock the housing part 11 with a housing part 12, not shown here.

Figure 8D:
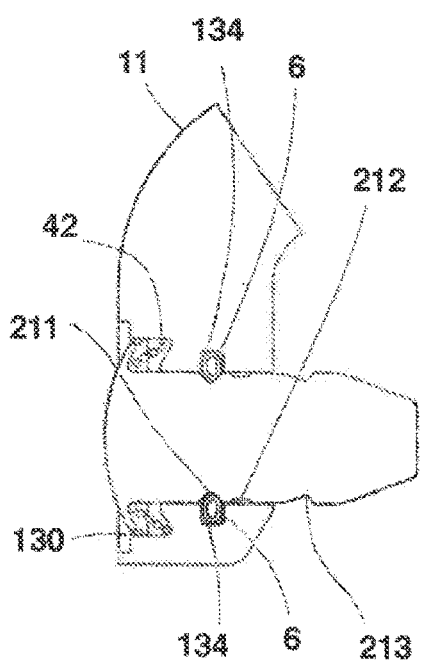

In FIG. 8d the following is shown: by the further insertion of the push button 20' by an additional second distance, the coil spring 6 with its internal region 61 passes into the unlocking groove 211. Since the unlocking groove 211 is larger than the locking groove 212, the coil spring 6 may now tilt by a slight movement of the push button 20' out of the plug connector housing 11 from its locking orientation and/or fixing orientation into its unlocking orientation. Thus the coil spring 6 is shown at this point in an intermediate position in which it tilts from its locking orientation into its unlocking orientation.

Figure 8E:
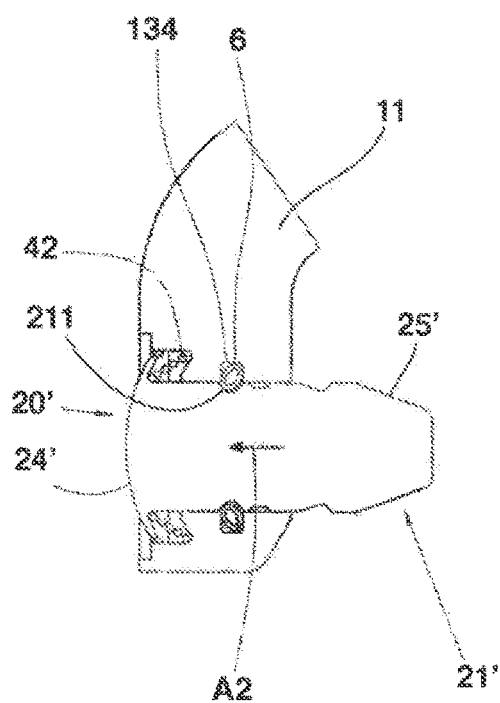

FIG. 8e shows the push button 20' in virtually the same position and differs from the previous view only in that the coil spring 6 is oriented in its unlocking orientation by a very slight movement of the push button 20' out of the housing part 11.

Figure 8F:
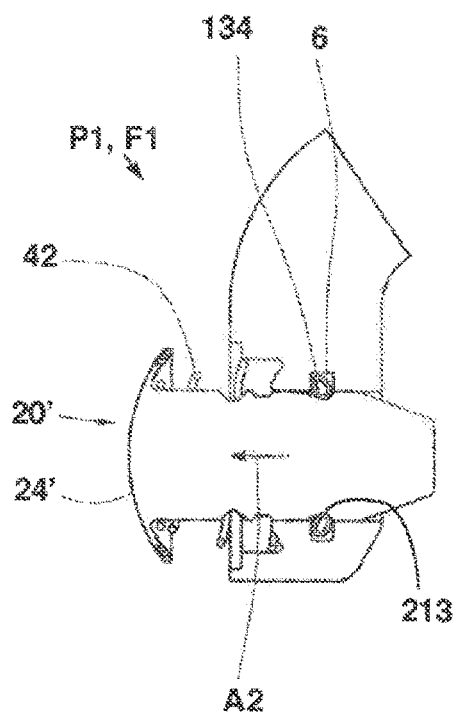

FIG. 8f shows how, relative to the previous view, the push button 20' has been moved by the first and the second distance out of the housing part 11. The push button 20' is thus located as in FIG. 8a in its first fixing position F1 of the fixing mechanism of the actuating device 2' which corresponds to a first unlocking position P1 of a locking mechanism of the housing part 11, not shown here. The coil spring 6 is arranged at the same time with its internal region 61 again in the retaining groove 213 and has also already been moved by, for example, a manual, very slight pushing of the push button 20' back into its locking orientation. Also in this position it may provide a significant resistance to a removal of the push button 20' by the contour of the retaining groove 213 so that such a removal does not occur inadvertently.

Figure 9A:
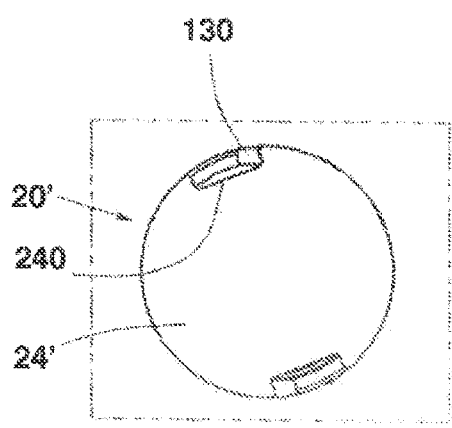
FIGS. 9a and b show a plan view of the head of the push button of FIGS. 7a and b.

FIG. 9a shows the push button 20' in a plan view of its push button head 24', i.e. the viewing direction corresponds to the axis of symmetry of the push button pin 21'. The push button 20' is located in a locking position since its polarization recesses 240 are not yet located in the vicinity of the polarization pins 130, i.e. in the viewing direction in front of the polarization pins 130. In simple terms, the push button 20' in its locking position is rotated relative to its unlocking position. On the one hand, therefore, when an attempt is made to push the push button 20' deeper into the housing part 11, the push button head 24' strikes against the polarization pins 130 or at least against a region of the polarization pins 130. On the other hand, at the same time the coil spring 6, as shown in FIG. 8c, is oriented in its locking orientation and arranged with its internal region 61 in the locking groove 212. As a result, the coil spring also prevents a movement of the push button 20' out of the housing part 11. The push button 20' is thus located in its locking position. Said push button may be moved neither in the second movement direction A2 out of the plug connector housing 11 nor in the first movement direction A1 deeper into the housing part 11. In this locking position the push button may lock the housing part 11, for example, with a second housing part 12, not shown here. This may occur, for example, by the push button engaging with its portion protruding into the interior of the housing part 11, as described above with reference to FIG. 1, into a recess of the housing part 12 and/or by the push button preferably cooperating with a locking element 5, described above with reference to FIG. 2 and FIG. 4, in a similar manner to the actuating device 2 of FIG. 4 with the locking element 5, so that the housing part 11 and the housing part 12 are locked together and additionally are sealingly pressed together.

Figure 9B:
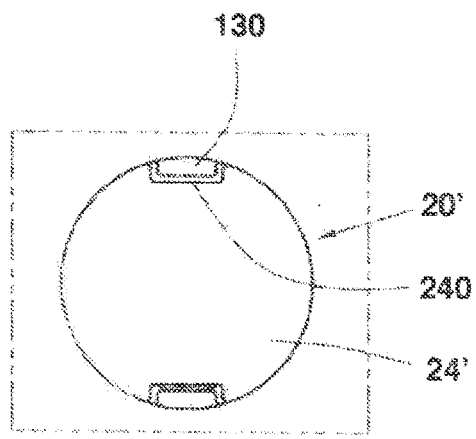

FIG. 9b shows the push button 20' from the same view in an unlocking position. The push button 20' in this case is slightly rotated to the right about the axis of symmetry of the push button pin 32 relative to the previous view. It may be easily identified that the polarization recesses 240 from the viewing direction are now directly arranged in front of the polarization pins 130, i.e. in the vicinity of the polarization pins 130. As a result it is possible to push the push button 20' by the second distance into the housing part 11, by the polarization recesses 240 of the push button head 24' encompassing the respective polarization pins 130. In this case, the push button 20' may thus move from its locking position, as shown in FIG. 8c, into a position as shown in FIG. 8d.

The push button head 24' may have suitable markings, not shown, for indicating the positions thereof, which are provided by rotation, and for the visual identification of the position of said push button head.

Figure 10A:
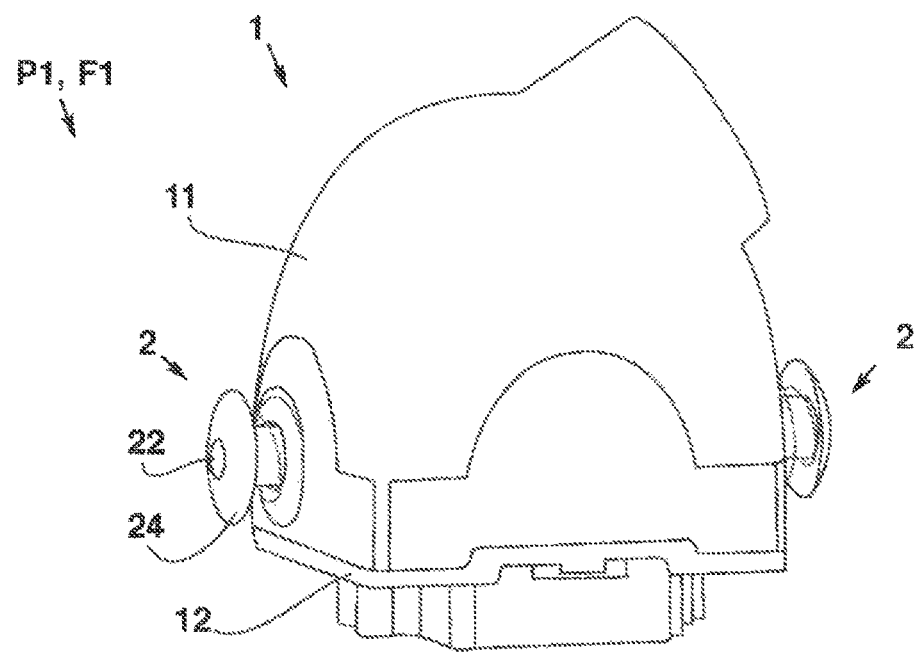
FIG. 10a shows a housing with a locking mechanism according to an embodiment of the invention in the unlocking position.
Figure 10B:
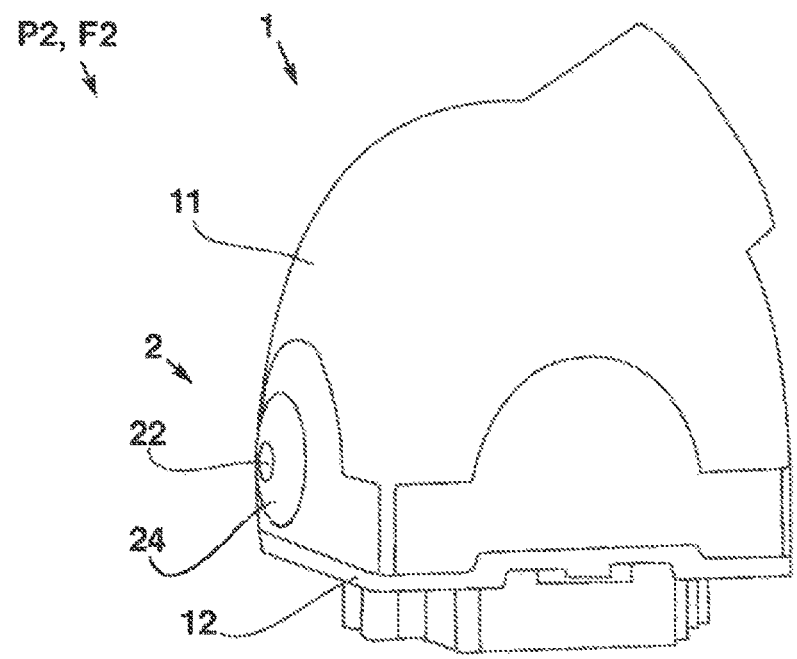
FIG. 10b shows the housing of FIG. 10a in the locking position.

FIG. 10a shows a housing 1 made up of two housing parts 11, 12 with a locking mechanism according to an embodiment of the invention in the unlocking position P1 and FIG. 10b shows the housing 1 of FIG. 10a in the locking position P2. The housing 1 of FIGS. 10a and b comprises a first and second locking mechanism with, by way of example, in each case an actuating device 2 according to FIG. 3, arranged on opposing walls of the housing 1, wherein the first housing part 11 is a housing upper part and the second housing part 12 is a housing lower part of a plug connector.

The head 24 of the push button 20, which is actuatable from the outside, is spaced apart from the outer wall of the first housing part 11 in the first unlocking position P1 and is substantially positively arranged with the outer wall of the first housing part 11 on the through-opening 110 in the second locking position P2.

In this manner, a visual confirmation of the locking status of the actuating device 2 of the connecting mechanism of FIGS. 10a and b is indicated and an arrangement which is simple to handle, convenient and unambiguous is provided. This also applies to the actuating device 2' of FIG. 7, not shown in FIGS. 10a and b.

Whilst various aspects or features of the invention are shown in each case in combination in the figures, for the person skilled in the art—unless indicated otherwise—it is obvious that the combinations shown and discussed are not the only possible ones. In particular, units or combinations of features which correspond to one another from different exemplary embodiments may be replaced with one another.

Locking Mechanism for Plug Connector Housing

LIST OF REFERENCE NUMERALS

1 Housing
11 Housing upper part, first housing part
110, 110' Opening, through-opening
111 Edge
12 Housing lower part, second housing part
121 Edge
125 Stepped portion
13, 13' Contour, inner contour
130 Polarization pin
131 First fixing recess, retaining recess
132 Second fixing recess, locking recess
133 Guide region
134 Housing groove
14 Receiver, free space
15 Channel
150 Widening
16 Seal
2, 2' Actuating device
20, 20' Push button
200 Opening
21, 21',21" Cylindrical push button pin
211, 211' Unlocking groove
212, 212' Locking groove
213 Retaining groove
23 Locking opening
24, 24' Head, push button head
240 Polarization recess
25, 25' Conical portion
22 Unlocking pin
220 Receiving recess
231 Restoring chamfer with retaining region
232 Cylindrical portion
233 Unlocking recess
3 Locking ball
30 Ball cage
41 Coil spring, first spring element
42 Conical helical spring, second spring element
45 Spring element, third spring element
5 Locking element, catch hook
50 Opening, through-passage
51 Hook
52 Arcuate portion, contour
53 Flattened portion, chamfer
54 Shoulder
55 Plane
6 Asymmetrical coil spring
60 Individual coils of asymmetrical coil spring
61 Inner region of asymmetrical coil spring
62 Outer region of asymmetrical coil spring
601 Major axis of individual coils of coil spring
602 Minor axis of individual coils of coil spring
P Pressure
P1 First unlocking position
P2 Second locking position
F1, F2 First, second fixing position
A Axial
A1 First axial movement direction in insertion direction
A2 Second axial movement direction counter to insertion direction
R Radial
S Pivoting movement
SL Cutting line
S1 Gap, spacing

The invention claimed is:

1. A locking mechanism for a housing which comprises a first and second housing part, for providing a first unlocking position (P1) and a second locking position (P2) of the two housing parts, having
a push button which extends in the axial longitudinal direction thereof through a through-opening of the first housing part into the interior of the housing;
wherein the push button is movably arranged, relative to the housing, between a predetermined first (F1) and second (F2) axial (A) position, each of which corresponds to the first (P1) and second (P2) position of the two housing parts; and having
a locking element provided in the interior of the housing; wherein
the push button and the locking element are configured such that the push button is in pressure contact with the locking element and cooperates with the locking element such that, in the case of an axial (A) movement of the push button from the first (F1) position thereof to the second (F2) position thereof, the second locking position (P2) of the two housing parts is provided with a radial (R) pressure contact between the two housing parts, such that a gap (S1) between the first and second housing parts is minimized, and
wherein the locking element is configured to be substantially U-shaped in the form of a shackle with an elongated shoulder; wherein two parallel limbs extend from the shoulder, in each case having a hook at the ends thereof; and wherein the limbs form with the shoulder a rounded arcuate portion so that a through-passage is provided; and Wherein a thickness of the locking element is flattened by a chamfer from the arcuate portion to its shoulder; and wherein the push button extends with its portion arranged in the interior of the housing into the through-passage and is in pressure contact with the arcuate portion of the through-passage.

2. The locking mechanism as claimed in claim 1, wherein the push button is configured to cooperate with the locking element such that the axial (A) movement of the push button from its first position (F1) into its second position (F2) also creates an axial (A) pressure contact between the locking element and the second housing part.

3. The locking mechanism as claimed in claim 1, wherein in the second position (P2) of the two housing parts a seal of the locked housing is provided by a sealing element which is provided in the gap (S1).

4. The locking mechanism as claimed in claim 1, wherein the locking element is configured such that in the first position (F1) of the push button said locking element is in pressure contact with the push button, wherein the locking element is fixedly retained in the first housing part.

5. The locking mechanism as claimed in claim 1, wherein the locking element is configured such that in the second position (F2) of the push button said locking element is in radial (R) pressure contact with the push button and at the same time is also in radial (R) pressure contact with the second housing part.

6. The locking mechanism as claimed in claim 1, wherein the locking element is configured such that, when the push button is moved into its first (F1) or second (F2) position, the locking element in each case performs an axial (A) and radial (R) pivoting movement (S).

7. The locking mechanism as claimed in claim 1, wherein a channel is provided in the first housing part, a spring element and the shoulder of the locking element being arranged therein such that the spring element exerts a radial pressure (R) onto the locking element.

8. The locking mechanism as claimed in claim 7, wherein in its path from the shoulder to the arcuate portion of the locking element the channel has a widening, such that a rail-like guidance of the locking element, which cooperates with the shoulder and the chamfer of the locking element, is provided such that the pivoting movement (S) of the locking element is performed with the movement of the push button.

9. The locking mechanism as claimed in claim 1, wherein a stepped portion is configured in the second housing part, the hooks of the locking element cooperating therewith such that the radial (R) pressure contact of the two housing parts is provided in the second locking position (P2).

10. The locking mechanism as claimed in claim 1, wherein the shackle-like locking element is closed at the ends of its limbs, so that a joined-together hook is provided with the through-passage.

11. The locking mechanism as claimed in claim 1, wherein the push button comprises a substantially cylindrical push button pin extending through the through-opening of the first housing part, in the interior of the housing a tapering conical portion being configured therein, wherein the locking element in the first position (F1) is in radial (R) pressure contact with the conical portion and when the push button moves from the first (F1) to the second (F2) position said locking element is in axial (A) and radial (R) pressure contact with the conical portion and in the second position (F2) said locking element is in radial (R) pressure contact with the push button pin.

12. The locking mechanism as claimed in claim 1, wherein the push button is an element of an actuating device of the locking mechanism, wherein the actuating device comprises a fixing mechanism of the push button which provides a fixing of the push button in its first (F1) and second (F2) position, which is releasable by axial (A) pressure (P) onto the actuating device, according to which the first (F1) and second (F2) position in each case is a first (F1) and second (F2) fixing position.

13. The locking mechanism as claimed in claim 12, wherein for providing the fixing mechanism of the push button the actuating device comprises in addition to the push button a plurality of further elements arranged coaxially to the push button in and/or on the through-opening and cooperating with the push button and/or with a contour configured in the through-opening of the first housing part and/or with one another, comprising an unlocking pin, a coil spring and a conical helical spring and comprising at least two locking balls.

14. The locking mechanism as claimed in claim 12, wherein for providing the fixing mechanism of the push button the actuating device comprises in addition to the push button an annular asymmetrical coil spring which is arranged coaxially to the push button pin of the push button and which is arranged in a contour in the through-opening of the first housing part and comprises a conical helical spring, and a contour with at least one unlocking groove and/or locking groove and/or retaining groove which cooperate with the coil spring are configured on the push button pin.

15. The locking mechanism as claimed in claim 1, wherein the locking element is configured integrally with the second housing part.

16. The housing of a plug connector having the first and second housing part and having at least one locking mechanism as claimed in claim 1, wherein the push button is configured such that an actuatable head of the push button in the first unlocking position (P1) is spaced apart from an outer wall of the first housing part and in the second locking position (P2) is arranged substantially positively with the outer wall of the first housing part on the through-opening.

17. The housing as claimed in claim 16, wherein the housing comprises a first and second locking mechanism which are arranged on opposing walls of the housing, wherein the first housing part is a housing upper part and the second housing part is a housing lower part of the plug connector.

18. The locking mechanism as claimed in claim 7, wherein a stepped portion is configured in the second housing part, the hooks of the locking element cooperating therewith such that the radial (R) pressure contact of the two housing parts is provided in the second locking position (P2).

19. The locking mechanism as claimed in claim 8, wherein a stepped portion is configured in the second housing part, the hooks of the locking element cooperating therewith such that the radial (R) pressure contact of the two housing parts is provided in the second locking position (P2).

* * * * *